Nov. 19, 1968  C. A. MATTSON ETAL  3,411,275
SELF-PROPELLED ROTARY LAWN MOWER
Filed July 5, 1966  5 Sheets-Sheet 1

INVENTORS
CHARLES A. MATTSON AND
WILLIAM V. KALNINS
by George R. Clark
ATTORNEY

Nov. 19, 1968   C. A. MATTSON ETAL   3,411,275
SELF-PROPELLED ROTARY LAWN MOWER
Filed July 5, 1966   5 Sheets-Sheet 2
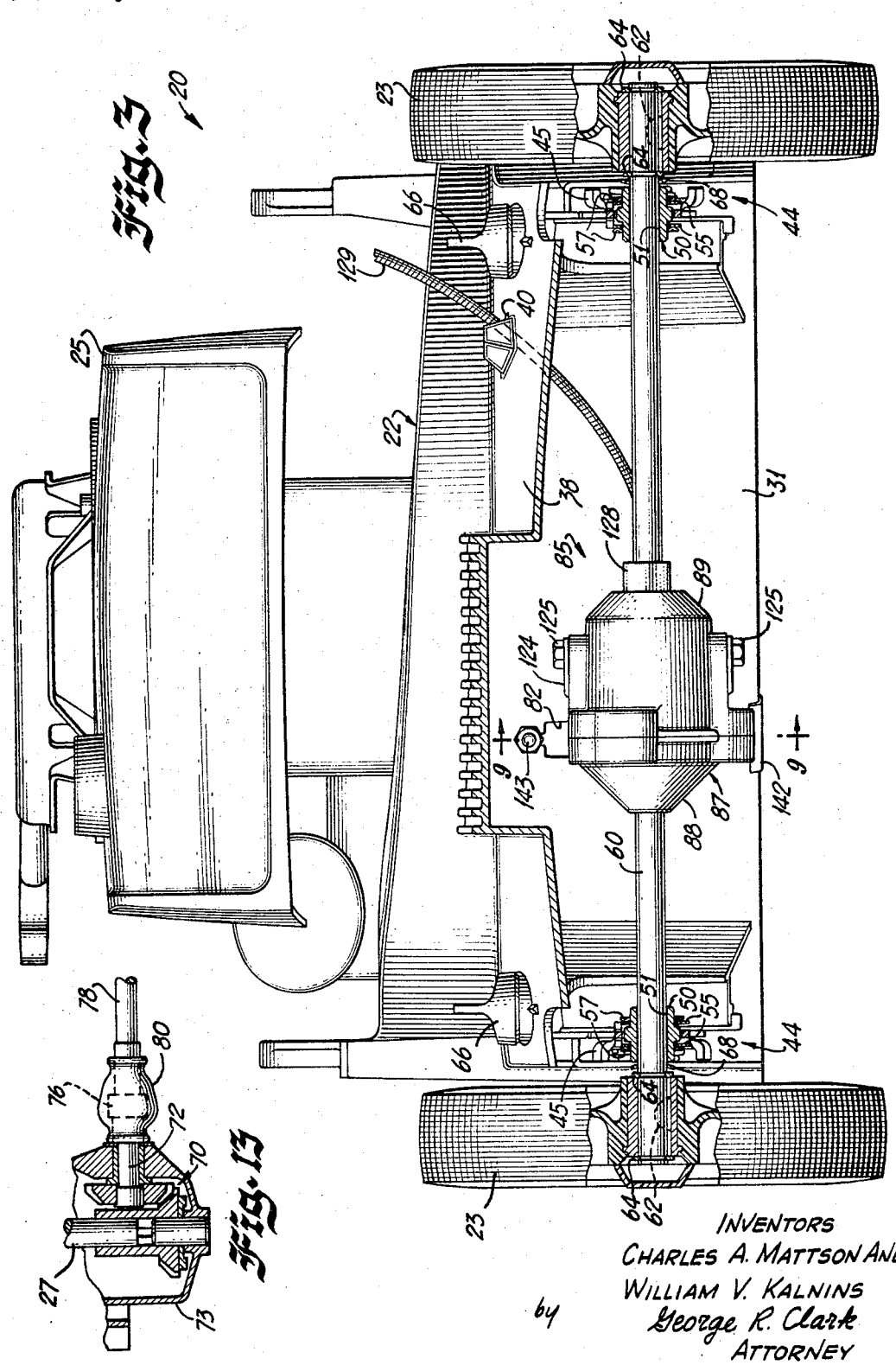
INVENTORS
CHARLES A. MATTSON AND
WILLIAM V. KALNINS
by George R. Clark
ATTORNEY

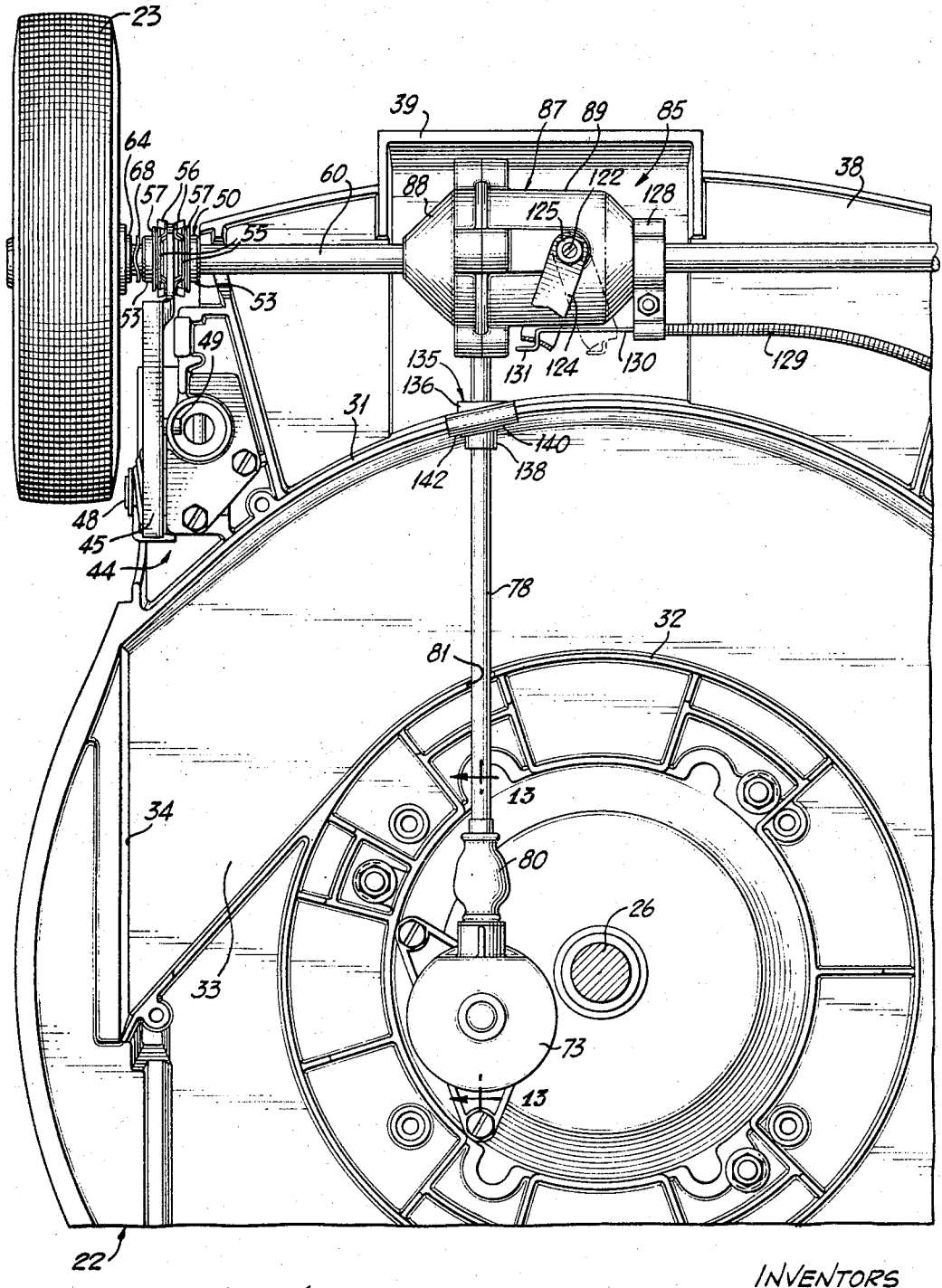

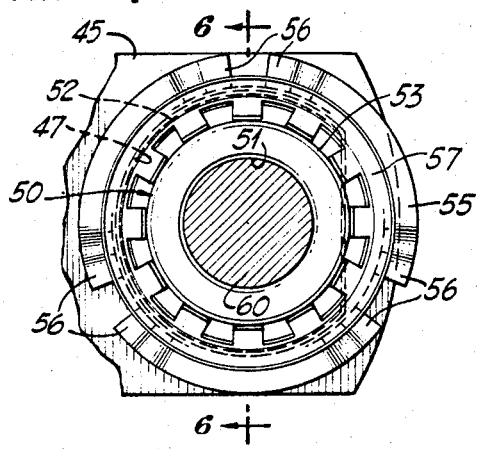
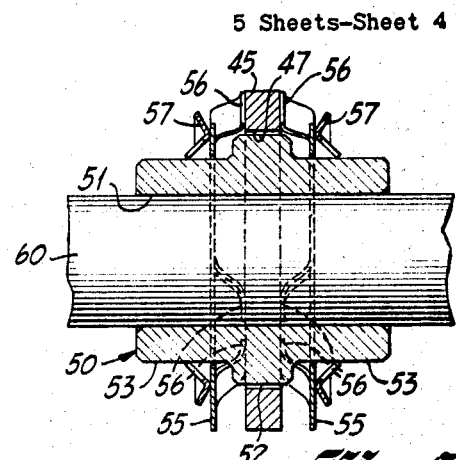
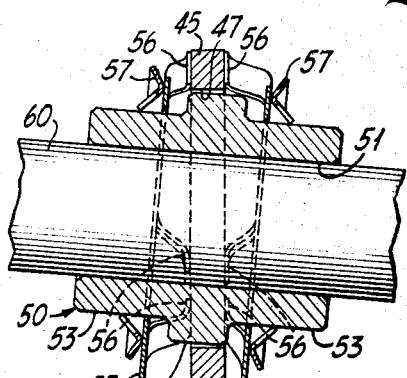
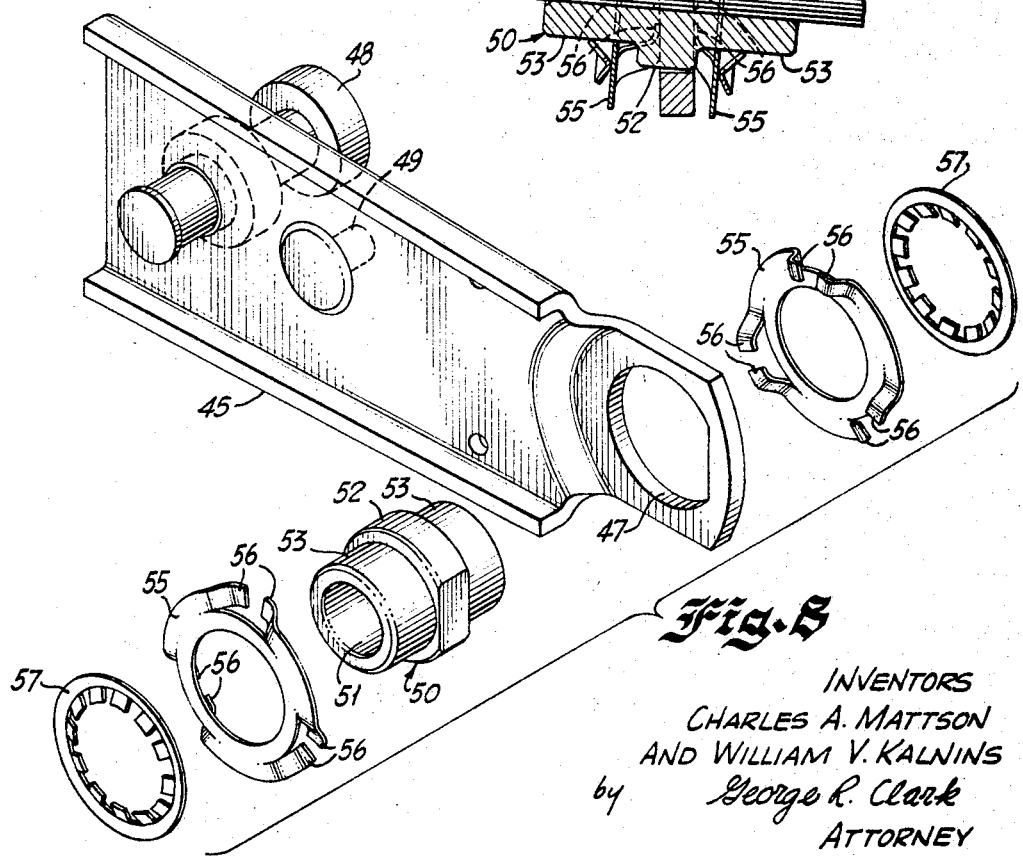

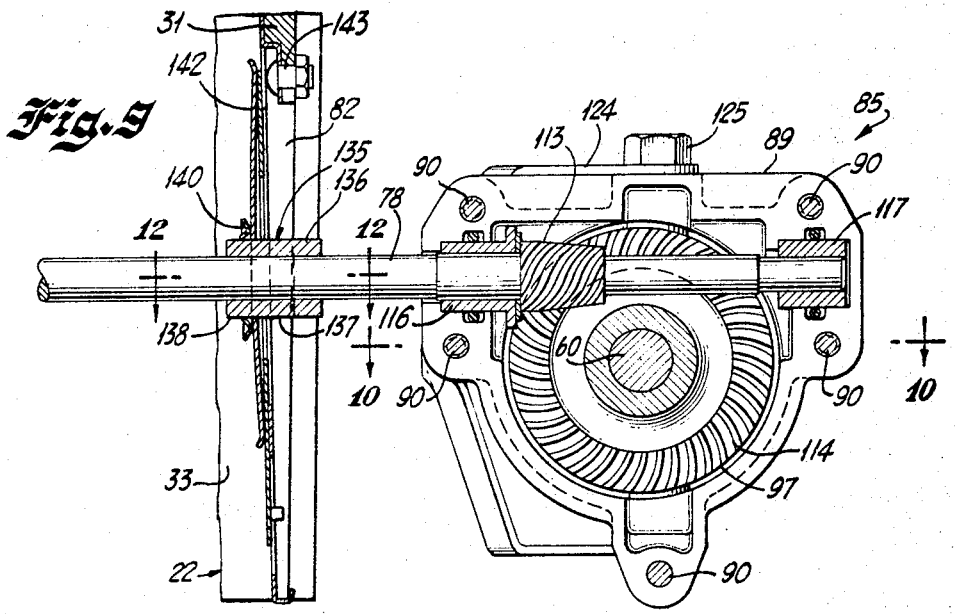
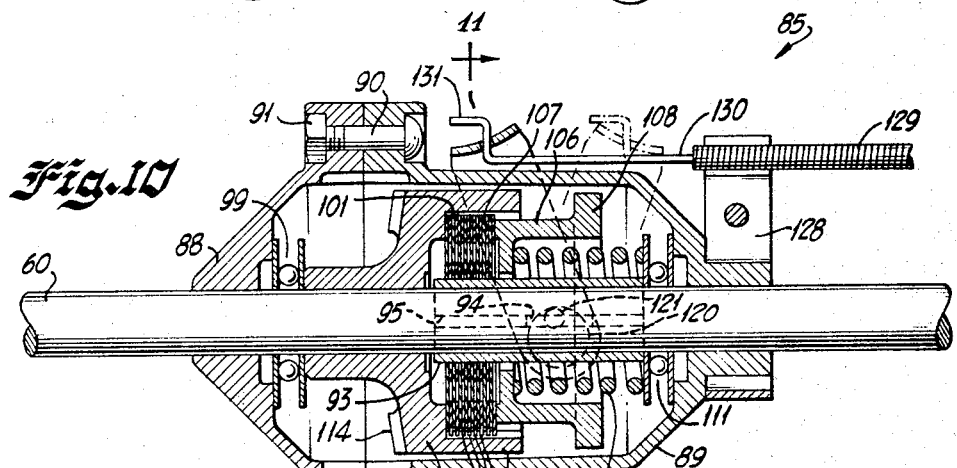
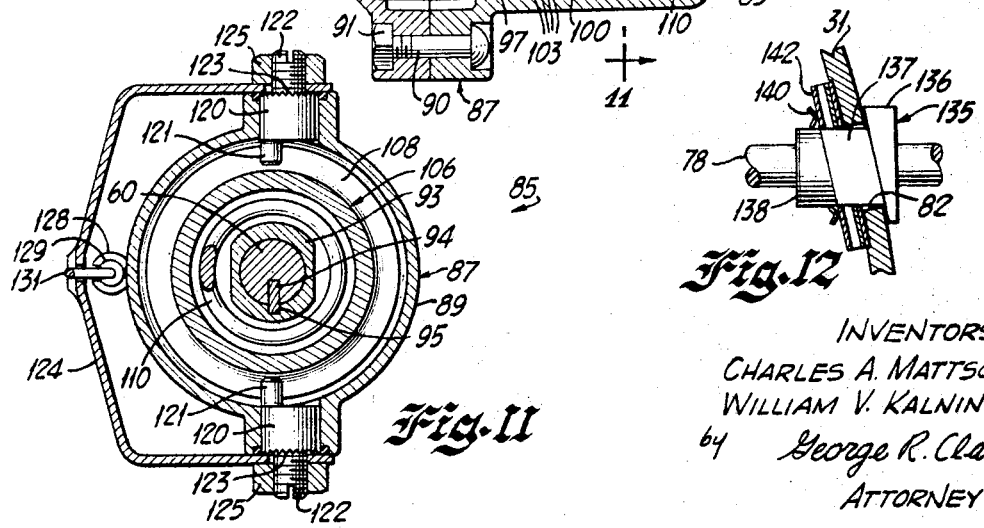
INVENTORS
CHARLES A. MATTSON AND
WILLIAM V. KALNINS
by George R. Clark
ATTORNEY United States Patent Office 3,411,275
Patented Nov. 19, 1968

3,411,275
SELF-PROPELLED ROTARY LAWN MOWER
Charles A. Mattson, Oak Park, and William V. Kalnins, Lombard, Ill., assignors to Sunbeam Corporation, Chicago, Ill., a corporation of Illinois
Filed July 5, 1966, Ser. No. 562,865
24 Claims. (Cl. 56—25.4)

This invention relates to rotary lawn mowers and more particularly to rotary lawn mowers having an improved self-propelling mechanism and means for supporting the drive wheel axle.

Rotary lawn mowers have gained wide popularity in recent years due in part to their ability to cut quickly all types of vegetation regardless of the height thereof at the time of mowing. These mowers are made in various sizes and include various features to facilitate use and improve the operation of the mowers. There is a demand for a self-propelling mechanism for the larger sizes to assist the user in moving the unit over the area to be cut. Self-propelled rotary lawn mowers invariably cost more than the push type models and, conseqeuntly, better performance is expected from them. However, many commercially available self-propelled rotary lawn mowers require considerable maintenance due to malfunctions and quickly worn parts in the driving mechanism. This is particularly evident in driving mechanism employing belts and chains which stretch and rapidly wear out.

In the rotary self-propelled lawn mower of the present invention, there is provided a sturdy drive mechanism having a heavy-duty clutch which is relatively small and easily integrated with the mower housing to allow considerable visual design freedom. The clutch is constructed to function for extended periods of use without requiring repairs. Furthermore, no belts or chains are required to convey the power from the engine to the drive wheels. The clutch has a torque limiting means which prevents damaging high loads from being imposed upon the internal engine components and also protects the power transmitting means between the engine and the clutch.

The facilitate assembly of the mower and lessen the burden of tight assembly tolerances, the clutch on the present lawn mower is carried by the wheel axle and is arranged so that the clutch may shift longitudinally on the axle.

One of the major requirements of a desirable self-propelled rotary lawn mower is that the height of grass cut can easily be changed. This is normally accomplished by varying the elevation of the wheels with respect to the lawn mower housing whereby the distance between the cutter and ground is correspondingly varied. The present lawn mower allows the axle carrying the drive wheels to pivot in a plane transversely disposed to the direction of mower movement. That is to say, the wheel axle can pivot vertically about its longitudinal axis during the wheel height adjustment procedure. Moreover, the mower can be used with the wheel setting higher on one side of the mower housing than on the other to allow the cutting of vegetation close to the ground adjacent to objects such as trees, houses, borders, etc.

Accordingly, it is an object of the present invention to provide a self-propelled rotary lawn mower which is easily assembled and sturdily constructed.

Another object of the present invention is to provide a self-propelled rotary lawn mower having a clutch mechanism including a speed reducing and torque limiting means.

Still another object of the present invention is to provide a self-propelled rotary lawn mower wherein the wheel axle carries a clutch which can slide longitudinally therealong.

A further object of the present invention is to provide a self-propelled rotary lawn mower containing a wheel axle which can pivot longitudinally and the wheels thereon can be set at different elevations with respect to the lawn mower housing.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 3 is an enlarged sectioned view taken substantially along line 3—3 of FIG. 1;

FIG. 4 is a fragmentary bottom view of the lawn mower taken substantially along line 4—4 of FIG. 2 but with the front wheel in its proper operating position;

FIG. 5 is an enlarged fragmentary portion of FIG. 2 illustrating the mounting of the wheel axle to the wheel elevation mechanism;

FIG. 6 is a sectioned view taken substantially along line 6—6 of FIG. 5;

FIG. 7 is a similar view to FIG. 6 but with the wheel axle longitudinally pivoted;

FIG. 8 is an exploded assembly view of a portion of the wheel elevation mechanism and the bearing assembly which supports the wheel axle;

FIG. 9 is a fragmentary enlarged sectioned view taken substantially along line 9—9 of FIG. 3;

FIG. 10 is a sectioned view taken substantially along line 10—10 of FIG. 9;

FIG. 11 is a sectioned view taken substantially along line 11—11 of FIG. 10 assuming that FIG. 10 shows the complete clutch;

FIG. 12 is a fragmentary sectioned view taken substantially along line 12—12 of FIG. 9; and FIG. 13 is a fragmentary partially sectioned view taken substantially along line 13—13 of FIG. 4.

Briefly, the present invention relates to a self-propelled rotary lawn mower having a housing on which is mounted an engine for rotating a cutter disposed within the housing. An axle is positioned under the housing and extends transversely to the direction of mower travel. Supporting wheels are secured to the axle near each end thereof and a wheel elevation mechanism on the housing rotatably supports the axle. For providing power to the wheels, a drive shaft extends above the cutter from the engine to the axle. Moreover, a clutch is positioned between the engine and wheels for controlling the power transmitted to the wheels.

In another aspect of the invention, the wheel axle is supported by the wheel elevation mechanism so that the axle can pivot longitudinally for facilitating the changing of the wheel elevation.

Figure 1:
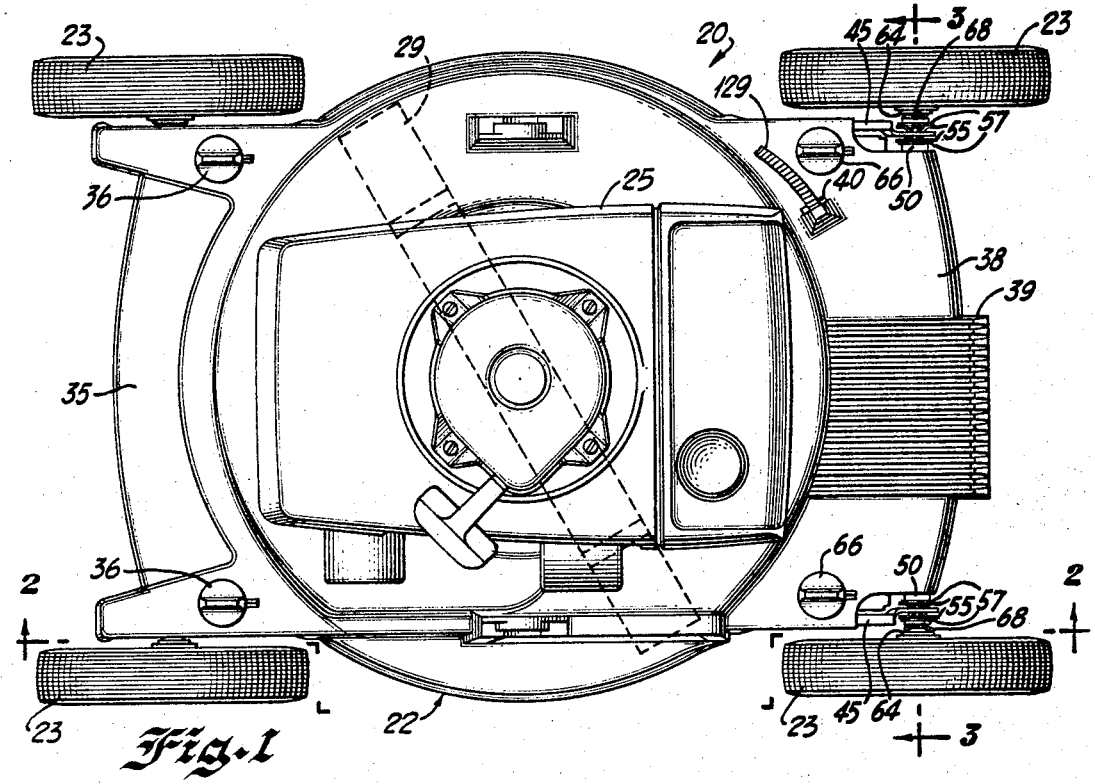
FIG. 1 is a top plan view of a self-propelled rotary lawn mower embodying the present invention and illustrated with the handle assembly removed.
Figure 2:
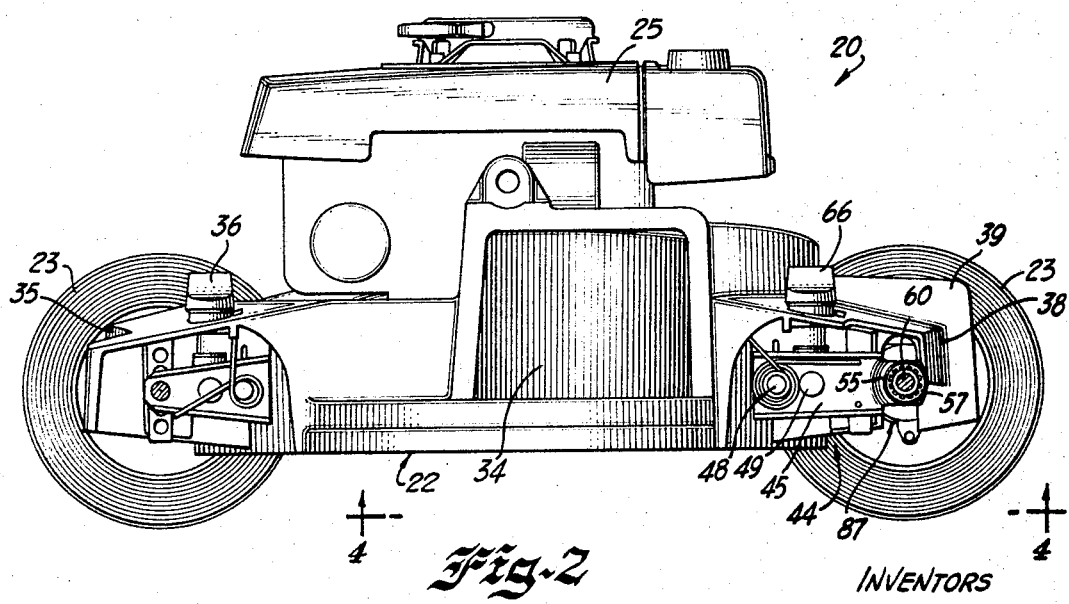
FIG. 2 is a side elevational view of the mower taken substantially along line 2—2 of FIG. 1 with two wheels removed to better illustrate the wheel elevation mechanism.

Referring now to the drawings in which like numerals designate like parts throughout the several views, the self-propelled rotary lawn mower is generally designated by the reference numeral 20. As may be easily seen in FIGS. 1 and 2, the lawn mower 20 includes an inverted cup-shaped housing 22 which is supported at each of its corners by a wheel 23 and a gasoline engine 25 is centrally mounted on top of the housing 22. The engine 25 has downwardly extending power shafts 26 and 27 and a cutter 29 is secured to power shaft 26 for rotation within the housing 22. It should be appreciated that the gasoline engine 25 could be replaced with an electric motor if sufficient power is available from the electric motor to operate both the rotary cutter 29 and the self-propelling mechanism disclosed hereinafter. Preferably, the housing 22 is cast from a lightweight material such as aluminum or magnesium.

The detailed construction of lawn mower housing 22 is not described herein but is disclosed in detail and claimed in copending application filed July 5, 1966, Ser. No. 562,666, which is assigned to the same assignee as the present invention. However, the present invention can also be employed with other suitable housings. In addition, the details of the wheel elevation mechanism are disclosed and claimed in the copending application Ser. No. 562,686, filed July 5, 1966, which is also assigned to the same assignee as the present invention. It should be appreciated that the housing 22 has an outer downwardly extending wall 31 and an inner downwardly extending wall 32 which form a channel 33 therebetween for conveying the severed vegetation outwardly through discharge opening 34. At the rear end of the lawn mower housing 22 is a transversely extending guard 35 and the rear wheels 23 are supported by wheel elevation mechanisms described in the heretofore mentioned copending application. The elevation of these wheels is controlled by the control knobs 36. At the front end of housing 22 is a guard 38 having an enlarged portion 39 which extends in a direction parallel to the line of travel for the lawn mower. The guard 38 defines an opening 40 which is used for a purpose hereinafter described.

Positioned at each corner near the front end of housing 22 is wheel elevation mechanism 44 including lever 45 which is pivotally connected to the housing at trunnion 48 so that it pivots in a vertical direction about a horizontal axis when lever pin 49 is acted upon. The wheel elevation mechanism 44 is similar to the mechanisms used at the rear end of the housing 22 except the rear pivotal lever has an integral axle upon which the wheel is supported while the front pivotal lever 45 has a non-uniform opening 47. Received within the pivotal lever opening 47 is bearing 50 having bore 51, raised peripheral surface 52 with a configuration complementary to opening 47 and cylindrical portions 53 disposed on each side of surface 52. With this construction, the bearing 50 when positioned within the lever opening 47 is not permitted to rotate due to the non-uniform shape of the opening 47 and surface 52. A spring 55 is positioned on each cylindrical bearing portion 53 and has a plurality of resilient fingers 56. Retaining the springs 55 on the bearing cylindrical portion 53 are lock washers 57. Thus, when assembled, bearing 50 is disposed within the pivotal lever 45 so that the raised surface 52 is positioned within the opening 47 and the springs 55 are located so that spring fingers 56 engage with the pivotal lever 45 whereby the springs bias the bearing to the position shown in FIG. 6. The bearing assembly is identical at both front levers 45 of the lawn mower.

In accordance with the present invention, a solid steel axle 60 extends transversely across the housing 22 near the front end thereof below guard 38 and is rotatably received within bearing bores 51. Rigidly secured to each end of axle 60 are supporting wheels 23 which are held in place by Woodruff keys 62 (shown in broken lines in FIG. 3). The wheels 23 are longitudinally held in place on axle 60 by means of lock washers 64. When it is desired to change the wheel elevation, front control knobs 66 are rotated which causes lever pins 49 to move vertically which, in turn, forces the levers 45 to pivot vertically about trunnions 48. Normally, one of the front control knobs 66 is rotated at a time causing the axle 60 to be longitudinally pivoted in a vertical plane about the bearing on the unadjusted side. The pivotal movement of the axle 60 requires the bearing 50 to pivot within the lever opening 47 in a manner indicated in FIG. 7. After the other control knob 66 has been properly adjusted, the axle 60 again assumes a horizontal position as indicated in FIG. 6 and the springs 55 force the bearing 50 back to its normal operation position. It should be appreciated that the axle 60 is free to slide longitudinally with respect to bearing 50. In order to control the longitudinal movement of axle 60, spring washers 68 are disposed immediately outside the bearings 50 on axle 60 causing the axle to be centrally located with respect to the housing.

As hereinbefore stated, engine 25 has a downwardly extending power shaft 26 which is preferably the engine crankshaft and which carries the rotatable cutter 29 and the engine has a downwardly extending power shaft 27 which is preferably the engine camshaft and which rotates at a lower speed than shaft 26. For the purpose of providing power to wheel axle 60, shaft 27 is in power driving relationship with bevel gear set 70 which is in driving engagement with horizontally disposed shaft 72 rotatably supported by gear box cover 73. Shaft 72 is in driving engagement with universal joint 76 which is secured to drive shaft 78. To prevent dirt and other impurities from interfering with the operation of universal joint 76, there is provided a rubber sleeve 80 completely enclosing joint 76. By means of the universal joint 76, drive shaft 78 is permitted to pivot with respect to shaft 72 and at the same time is in driving relationship therewith. The drive shaft 78 extends forwardly through a vertically extending slot 81 in inner wall 32 and through slot 82 in outer wall 31 and it terminates in clutch 85 carried on axle 60.

In accordance with the present invention, the clutch 85 includes a split casing 87 having two cup-shaped sections 88 and 89 with axle 60 extending longitudinally therethrough. The casing 87 is held together by a plurality of screws 90 and nuts 91. Within casing 87 is a sleeve 93 which is mounted around axle 60 and rotates therewith due to key 94 in axle 60 projecting into sleeve keyway 95 which extends the complete length of said sleeve. In this manner, the sleeve 93 is permitted to move longitudinally along axle 60 and also rotates therewith. Positioned adjacent to sleeve 93 is drive member 97 which is rotatably mounted on axle 60. One end of drive member 97 is locked against longitudinal movement by thrust bearing 99 which abuts split casing section 88. The other end of drive member 97 includes a cup-shaped portion 100 having an internal annular vertical shoulder 101. A plurality of friction discs 103 are carried on sleeve 93 and have alternating discs keyed to the sleeve and remaining discs keyed to drive member 97 in a manner well-known in the art. When no squeezing pressure is exerted upon the plurality of friction discs 103, those discs attached to the sleeve rotate therewith while the discs attached to the drive member 97 rotates therewith. Preferably, spring washers are placed between the friction discs in order to prevent any adhesion therebetween due to the lubricating fluid normally contained within the casing 87.

Disposed around sleeve 93 is actuator or pressure member 106 having at one end an annular projection 107 adjacent to the friction disc 103 and at the other end a cup-shaped portion 108 which receives clutch spring 110. One end of spring 110 and the corresponding end of sleeve 93 abut thrust bearing 111 which rests against split casing section 89. When the spring 110 is free to act upon pressure member 106, it biases this member with sufficient force to squeeze the friction discs 103 between the pressure member and drive member so that the drive member 97, discs 103 and sleeve 93 are effectively locked together. However, it should be understood that the clutch 85 may slide longitudinally along axle 60 since the Woodruff key 94 is relatively short in comparison with the sleeve keyway 95 and, consequently, the clutch may move with respect to the axle until the key 94 abuts either the drive member 97 or the thrust bearing 111.

In order to supply power to the clutch 85, the drive shaft 78 has a pinion gear 113 which is disposed within the casing 87 and in driving engagement with face gear 114 which is integrally formed with drive member 97. The drive shaft 78 is journalled in the casing 87 by bearings 116 and 117 disposed on opposite sides of pinion gear 113. Therefore, whenever the engine 25 is operating, drive member 97 is rotated on axle 60 due to the engagement of pinion gear 113 with face gear 114. Moreover, spring 110 tends to lock the friction disc together causing axle 60 to rotate with drive member 97. The relationship between the pinion gear 113 and the face gear 114 is such that there is an appropriate reduction in speed so that drive member 97 rotates at a slower speed than drive shaft 78. Inasmuch as the friction discs 103 are squeezed together by spring 110, whenever there is an excessive load imposed upon axle 60, the friction discs will slip so that a damaging load is not impressed upon the drive shaft 78, universal joint 76, bevel gear set 70 or the internal components of engine 25. It should be appreciated that the connection between the drive shaft 78 and clutch 85 prevents the clutch casing 78 from rotating on axle 60.

Rotatably mounted on each side of clutch casing section 89 are identical cams 120 each having an eccentrically disposed pin 121 which extends inwardly and is adapted to engage with pressure member cup-shaped portion 108. Each cam 120 is provided with an outwardly extending threaded stud 122 and a serrated shoulder 123. A U-shaped arm 124 has its ends locked to cams 120 by means of nuts 125 which are in threaded engagement with cam studs 122 causing the arms to be forced against the serrated shoulder 123. With this arrangement, the angular relationship between the U-shaped arm 124 and the cams 120 can be easily adjusted. Since the cams 120 are rotatably mounted to the casing section 89, the rotation of arm 124 causes the pins 121 to move with respect to the pressure member cup-shaped portion 108. A clamp 128 is locked to one end of casing section 89 and holds a flexible cable 129 having a rod 130 extending therethrough and formed with a hook 131 at the end thereof. The rod hook 131 is inserted through an opening in the bight portion of arm 124 establishing an operating connection between the rod and arm. The cable 129 extends from the clutch 85 through the guard opening 40 in the housing 22 and is anchored to any convenient location either on the lawn mower handle, engine or housing so that when the user may operate it causing the rod 130 to reciprocate within the cable 129 to actuate the clutch. As may be seen in FIG. 10, the U-shaped member 124 is shown in solid lines in the driving position so that the spring 110 forces the pressure member to squeeze the friction disc 103 causing a driving connection between the drive member 97 and axle 60. When the rod 130 is withdrawn into the flexible cable 129 so that the arm 124 rotates to the position shown in broken lines in FIG. 10, the eccentric pins 121 cam the pressure member cup-shaped portion 108 toward the right so that the annular projection 107 does not push against the friction disc 103 whereby the front wheels 23 are not driven by the engine 25 and axle 60 is free to rotate independently from drive shaft 87.

The location of the clutch 85 along the axle 60 is determined by the position of drive shaft 78 in housing 22. As previously stated, the drive shaft 78 passes through the outer walls 31 at slot 82. As may be seen in FIGS. 9 and 12, the drive shaft 78 passes through a T-shaped bearing 135 which is disposed in slot 82. The bearing 135 has a shoulder portion 136 which is tapered so that it conforms to the circular outer wall 31, a square portion 137 and a cylindrical portion 138. The bearing shoulder portion 136 is disposed along the side of the outer wall 31 facing the clutch 85 while the cylindrical portion 138 projects into channel 33. A retaining washer 140 is pressed onto the cylindrical bearing portion 138 whereby the bearing is prevented from moving longitudinally along the drive shaft 78 and is effectively locked within the slot 82 although it is permitted to move vertically therein. Thus, as the axle 60 is moved in the vertical direction by means of the wheel elevating mechanism, the drive shaft 78 will also correspondingly pivot in the vertical direction causing the T-shaped bearing 135 to move vertically within the slot 82. The square portion of bearing 137 is trapped within the vertically extending slot 82 to prevent the bearing 135 from rotating. Inasmuch as the clutch 85 can slide along the axle 60, the location of the clutch is determined by the connection between drive shaft 78 and the vertical slot 82. Thus, in assembly, close tolerances are not required concerning the location of the drive shaft 78, clutch 85, axle 60 and the slot 82. In order to prevent grass clippings from passing through slot 82, an overlapping multiplate shield 142 may be attached to the bearing 135 and it extends the length of the slot. The shield 142 is held to the outer wall 31 by means of a threaded fastener 143.

The present rotary lawn mower represents a material advance in the art by providing a heavy duty self-propelling system wherein both drive wheels are mounted on a single axle and the axle carries a clutch thereon which may be slidably positioned to facilitate assembly. In addition, the wheel elevation mechanism allows each of the drive wheels to be independently set without interfering with the self-propelling system. The clutch not only controls the power transmitted to the drive wheels but also functions to reduce the engine speed to the wheel axle and limits the load imposed upon the drive shaft, engine and parts therebetween. Furthermore, the present self-propelling mechanism and wheel elevation mechanism permits considerable visual design freedom due to its integration with and being diospsed within the lawn mower housing.

What is claimed as new and desired to be secured by Letters Patent of the United States is:

1. In a self-propelled rotary lawn mower comprising an inverted cup-shaped housing supporting an engine, a cutter disposed under said housing and secured to said engine for rotation, an axle extending horizontally under and across said housing and attached to a supporting wheel at each end thereof, said axle rotatably supported by a bearing positioned near each of said wheels, levers pivotally attached to said housing and said levers receive and support said bearings so that said axle can pivot about a longitudinal axis, wheel elevation means carried by said housing for selectively positioning and controlling the pivotal movement of each of said levers, clutch means mounted on said axle within said housing between said wheels, power means positioned under said housing and extending from said engine to said clutch means for transmitting power to said wheels through said clutch means.

2. In the self-propelled rotary lawn mower of claim 1 wherein said pivotal levers are each formed with a non-uniform opening which receives said bearing having a complementary periphery preventing rotation therebetween, said bearing being of the sleeve type, spring means disposed on said bearing located on both sides of said lever for biasing said bearing toward said lever, said lever opening being sufficiently larger than said bearing periphery for permitting said bearing to pivot with respect to said lever.

3. In the self-propelled rotary lawn mower of claim 1 wherein said clutch means including a casing rotatably mounted on said axle, a drive member rotatably disposed on said axle in said casing and in engagement with said power means, a plurality of discs alternately connected to said drive member and said axle, a pressure member adapted within said casing to force said discs together, spring means biasing said pressure member towards said drive member, cam means rotatably supported by said casing and engageable with said pressure member for controlling its movement toward said drive member, arm means connected to said cam means for controlling the rotation thereof, and flexible cable means attached to said casing and controlling the movement of said arm means, said flexible cable means extending above said housing and connected thereto.

4. In the self-propelled rotary lawn mower of claim 3 wherein there is adjustment means between said arm means and cam means whereby the angular relationship therebetween can conveniently be changed.

5. In the self-propelled rotary lawn mower of claim 4 wherein said cam means including two oppositely disposed eccentrics having inwardly extending pins engageable with said pressure member, said arm means including a U-shaped element having its ends locked to said eccentrics, the bight portion of said U-shaped element secured to one end of said flexible cable means.

6. In a self-propelled rotary lawn mower comprising an inverted cup-shaped housing being provided with an engine thereon, a cutter disposed within said housing for horizontal rotation and connected to said engine, an axle positioned under said housing and extending transversely to the direction of mower travel, a supporting wheel secured to said axle near each end thereof, wheel elevation means carried by said housing and rotatably supporting said axle, drive shaft means extending above said cutter from said engine to said axle for transmitting power thereto, clutch means between said engine and said wheels for controlling the power transmitted to said wheels.

7. In the self-propelled rotary lawn mower of claim 6 wherein said clutch means including a torque limiting means for preventing excessive load from being imposed upon said engine.

8. In the self-propelled rotary lawn mower of claim 7 wherein said torque limiting means including a plurality of friction discs which are spring biased together when said clutch means is in a power transmitting condition.

9. In the self-propelled rotary lawn mower of claim 6 wherein said engine is centrally located on said housing, and said drive shaft means extends generally in the direction that the mower is propelled.

10. In the self-propelled rotary lawn mower of claim 6 wherein said drive shaft means including a pivotal connection adjacent said engine whereby said drive shaft means can pivot in a vertical direction as said wheel elevation means varies the position of said axle with respect to said housing.

11. In the self-propelled rotary lawn mower of claim 10 wherein said clutch means is supported on said axle, said drive shaft means connected to said clutch means, said clutch means slidable on said axle and the position of said clutch means on said axle maintained by said drive shaft means.

12. In the self-propelled rotary lawn mower of claim 11 wherein said clutch means includes a casing and speed reduction means therein for causing said axle to rotate at a slower speed than said drive shaft means, said drive shaft means connected to said casing and preventing it from rotating.

13. In the self-propelled rotary lawn mower of claim 10 wherein said wheel elevation means including levers pivotally connected to said housing and rotatably supporting each end of said axle in bearing means, said bearing means adapted for pivotal movement with respect to said levers whereby said axle can pivot transversely with respect to said housing.

14. In the self-propelled rotary lawn mower of claim 11 wherein said housing defining a vertically extending slot, bearing means rotatably receiving said drive shaft means and attached to said housing so that it can slide vertically within said housing slot.

15. In a self-propelled rotary lawn mower comprising a housing upon which is mounted an engine, an axle rotatably supported by said housing, a wheel secured to said axle near each end thereof, a clutch means carried on said axle between said wheels and mounted thereto so that it can slide longitudinally along said axle, drive shaft means between said engine and said clutch whereby said engine can selectively drive said wheels, said clutch means assuming a longitudinal position along said axle so that it is in proper operating alignment with said drive shaft.

16. In the self-propelled rotary lawn mower of claim 15 wherein said clutch means including a casing and speed reducing gear means therein whereby said axle rotates at a slower speed than said drive shaft means, said drive shaft means journalled in said casing and having a pinion thereon in power transmitting engagement with said gear means.

17. In the self-propelled rotary lawn mower of claim 16 wherein said housing containing bearing means which rotatably receives said drive shaft means, said drive shaft means supporting said clutch means casing against rotation.

18. In the self-propelled rotary lawn mower of claim 15 wherein said clutch means is disposed under said housing, a flexible cable attached to said clutch means for controlling the operation thereof, said cable extending through said housing and connected thereto.

19. In a self-propelled rotary lawn mover comprising a housing supporting an engine, an axle carrying a supporting wheel near each end thereof, said engine supplying power to rotate said wheels, wheel elevating means carried by said housing and defining openings, bearing means disposed within said openings rotatably supporting said axle, said bearing means permitting said axle to pivot with respect to said wheel elevating means without interfering with the rotation of said axle.

20. In the self-propelled rotary lawn mower of claim 19 wherein said bearing means including members secured to said axle and received in said wheel elevating means openings so that said members and axle can pivot with respect to said elevating means, and spring means attached to said members on each side of said elevating means for biasing said members toward said elevating means and retaining said members in proper alignment in said elevating means openings, said wheel elevating means including two levers pivotally mounted to said housing each containing one of said openings, said lever openings being irregularly formed and said members having a periphery with a complementary shape so that said members cannot rotate with respect to said levers, said axle rotatably supported by said members.

21. In a self-propelled rotary lawn motor comprising a housing supporting a gasoline engine, said engine being provided with a downwardly extending first engine shaft to which a cutter is secured for rotation within said housing, a second engine shaft depending from said engine into said housing, wheel means connected to said housing for rotation, power transmission means under said housing between said second engine shaft and said wheel means, said power transmission means including clutch means for selectively providing power from said engine to rotate said wheel means.

22. In the rotary lawn mower of claim 21 wherein said engine including a crankshaft and camshaft, said first engine shaft being said engine crankshaft and said second engine shaft being said engine camshaft, said first engine shaft rotatable at a greater speed than said second engine shaft.

23. In the rotary lawn mower of claim 22 wherein said wheel means is attached to an axle, said clutch means being secured to and supported by said axle, said housing having means for vertically moving said axle, said power transmission means including a universal joint and a drive shaft between said universal joint and clutch means.

24. In a self-propelled rotary lawn mower comprising a gasoline engine mounted on an inverted cup-shaped housing, said engine being provided with a downwardly depending crankshaft and camshaft both of which extend into said housing, a cutter secured to said engine crankshaft for rotation within said housing, an axle rotatably supported by said housing and having a wheel near each end thereof, clutch means carried by said axle, power transmission means between said engine camshaft and clutch means whereby said engine can selectively drive said wheels.

References Cited

UNITED STATES PATENTS

| | | | |
|---|---|---|---|
| 2,645,300 | 7/1953 | Watts et al. | 56—25.4 XR |
| 2,688,224 | 9/1954 | Hainke | 56—25.4 |
| 2,722,281 | 11/1955 | Falkenberg | 180—19 |
| 2,764,268 | 9/1956 | Summerour | 56—25.4 XR |
| 2,886,934 | 5/1959 | Jepson | 56—25.4 XR |
| 2,893,501 | 7/1959 | Smith | 180—19 |
| 2,996,134 | 8/1961 | Muerle et al. | 180—19 |
| 3,014,546 | 12/1961 | Banka | 180—19 |
| 3,063,436 | 11/1962 | Wehner | 56—25.4 XR |

RUSSEL R. KINSEY, *Primary Examiner.*